United States Patent [19]
Harnischfeger

[11] Patent Number: 5,227,115
[45] Date of Patent: Jul. 13, 1993

[54] PROCESS FOR ALIGNING LIQUID-CRYSTALLINE POLYMERS

[75] Inventor: Peter Harnischfeger, Darmstadt, Fed. Rep. of Germany

[73] Assignee: Hoechst Aktiengesellschaft, Frankfurt am Main, Fed. Rep. of Germany

[21] Appl. No.: 664,861

[22] Filed: Mar. 5, 1991

[30] Foreign Application Priority Data

Mar. 7, 1990 [DE] Fed. Rep. of Germany ....... 4007144

[51] Int. Cl.⁵ .................... B29B 13/02; B29C 35/04; B29C 71/02
[52] U.S. Cl. ............................. 264/544; 264/108; 264/500; 264/510; 264/570; 427/165; 428/910
[58] Field of Search ............... 264/108, 500, 510, 544, 264/570, 340; 427/165, 910; 428/910

[56] References Cited

U.S. PATENT DOCUMENTS

| | | | |
|---|---|---|---|
| 3,953,626 | 4/1976 | Suzuki et al. | 264/500 |
| 4,139,586 | 2/1979 | Gasson | 264/544 |
| 4,636,338 | 1/1987 | Neefe | 264/500 |
| 4,925,161 | 5/1990 | Allan et al. | 264/108 |
| 4,952,661 | 8/1990 | Foa' et al. | 528/125 |
| 4,954,600 | 9/1990 | Hachiya | 528/89 |
| 5,073,219 | 12/1991 | McArdle et al. | 264/24 |

FOREIGN PATENT DOCUMENTS

| | | |
|---|---|---|
| 0297554A2 | 1/1989 | European Pat. Off. |
| 0300752 | 1/1989 | European Pat. Off. |
| 0310081A2 | 4/1989 | European Pat. Off. |
| 0322703A2 | 7/1989 | European Pat. Off. |
| 0348873A2 | 1/1990 | European Pat. Off. |
| 0402103 | 12/1990 | European Pat. Off. |
| 53-008658 | 1/1978 | Japan ................................... 264/500 |
| 2194792 | 3/1988 | United Kingdom |

OTHER PUBLICATIONS

Patent Abstracts of Japan vol. 11, No. 282 (C-446) Sep. 11, 1987.
Patent Abstracts of Japan vol. 12, No. 477 (P-800)(3324) Dec. 14, 1988.
Patent Abstracts of Japan vol. 12, No. 394 (P-773)(3241) Oct. 20, 1988.
Patent Abstracts of Japan vol. 8, No. 163 (P-290)(1600) Jul. 27, 1984.

Primary Examiner—Jan H. Silbaugh
Assistant Examiner—Brian J. Eastley
Attorney, Agent, or Firm—Curtis, Morris & Safford

[57] ABSTRACT

A process for aligning a layer of a liquid-crystalline, polymeric material in which a gas or liquid stream is passed over the liquid-crystalline, polymeric material, preferably for aligning main-chain polymers which have a nematic phase by passing a hot stream of air onto the material. Electrooptical displays which contain an alignment layer of this type have high contrast. The alignment layers have advantages over conventional rubbed alignment layers since, for example, no electrostatic charging takes place.

7 Claims, 3 Drawing Sheets

| Z | α | |
|---|---|---|
| | 0° | 3° |
| (1) ⟨shape⟩ | 4 - 8 | 8 - 12 |
| (2) ⟨cylinder⟩ | 15 - 20 | 25 - 30 |
| (3) ⟨block⟩ | 25 - 30 | 70 - 80 |

Fig. 4

PROCESS FOR ALIGNING LIQUID-CRYSTALLINE POLYMERS

The combination of the unusual anisotropic and fluid properties of liquid crystals has resulted in the use of liquid-crystalline materials in electrooptical switching and display devices (displays). As well as the electrical, magnetic and elastic properties, the thermal properties of the liquid crystals can be utilized for changes in alignment.

Optical effects can be achieved with the aid of birefringence ("birefringence mode"), the inclusion of dyes ("guest-host mode") or light scattering. To this end, materials having nematic liquid-crystal phases and those having smectic liquid-crystal phases have been used hitherto. Examples of displays of this type have already been disclosed in numerous patent specifications and technical publications.

Liquid-crystal displays contain, inter alia, the following components: substrate plates (for example made of glass or plastic), coated with transparent electrodes and an alignment layer, spacers, a sealing frame, polarizers and, for color displays, thin colored filter layers. Other possible components are antireflection, passivation, leveling and barrier layers and electrical non-linear elements, such as, for example, thin-film transistors (TFTs) and metal-insulator-metal (MIM) elements. The construction of liquid-crystal displays has already been described in detail in the relevant monographs (for example E. Kaneko, "Liquid Crystal TV Displays: Principles and Applications of Liquid Crystal Displays", KTK Scientific Publishers, 1987, pages 12–30 and 163–172).

Of the abovementioned components, the alignment layer has particular importance. As is known, its purpose is to ensure a uniform, defect-free alignment of the longitudinal molecular axes and thus high contrast. It may comprise either organic polymers or inorganic layers.

The organic polymer layers used as alignment layers are usually applied to the surfaces to be coated (for example substrate plates) in the form of polymer solutions or solutions of soluble polymer precursors by printing, spraying, dipping or spin-coating and are subsequently cured, generally by heating the wet film. In order to achieve an alignment effect, the hard polymer layer obtained can be rubbed with a roller coated in a velour-like manner or covered with velour, or with a brush or similar devices, whereby the polymer surface is roughened, preferably in an alignment direction.

However, this surface treatment has the disadvantage of producing abraded particles which result in short circuits in the display, have an adverse effect on the planarity of the display and can reduce the contrast. In addition, rubbing processes cause electrostatic charges, which damage the thin-film transistors present on the substrate plate.

The alignment layers may alternatively comprise inorganic materials, such as, for example, silicon oxide, and are aligned by other processes, such as, for example, by vapor deposition at an angle.

However, vapor-deposition processes such as, for example, for silicon oxide (SiO), are disadvantageous due to the high costs and the considerable expense involved in achieving homogeneity in large areas.

For use of alignment layers in displays, it should also be noted that the alignment effect is retained up to a critical temperature determined by the manufacture of cells and displays. This is, in particular, the curing temperature of adhesives employed for constructing the cell, which is preferably at about 150° C.

The object of the present invention is to provide a process for aligning alignment layers for liquid-crystal displays which avoids the above-described disadvantages of the alignment techniques employed hitherto. In addition to good adhesion to the substrate and high transparency, the alignment layers must facilitate particularly uniform alignment both of nematic and of smectic liquid crystals and must result in high contrast in electrooptical displays. A further object is to develop novel materials for alignment layers having said positive properties.

This object is achieved by an alignment process based on liquid-crystalline polymers (LCPs).

JP-A 89/196,250 presents an alignment layer which comprises an LCP film formed by the LCP flowing into the liquid-crystal phase and subsequently cooling.

By contrast, the present invention uses the interaction with a gas or liquid flow to form the alignment layer from a pre-existing LCP film (without contact of the LCP with mechanical components).

BRIEF DESCRIPTION OF THE DRAWINGS

FIG. 4 shows the alignment effect of various nozzle configurations and angles of incidence.

DETAILED DESCRIPTION OF THE PREFERRED EMBODIMENTS

Figure 1:
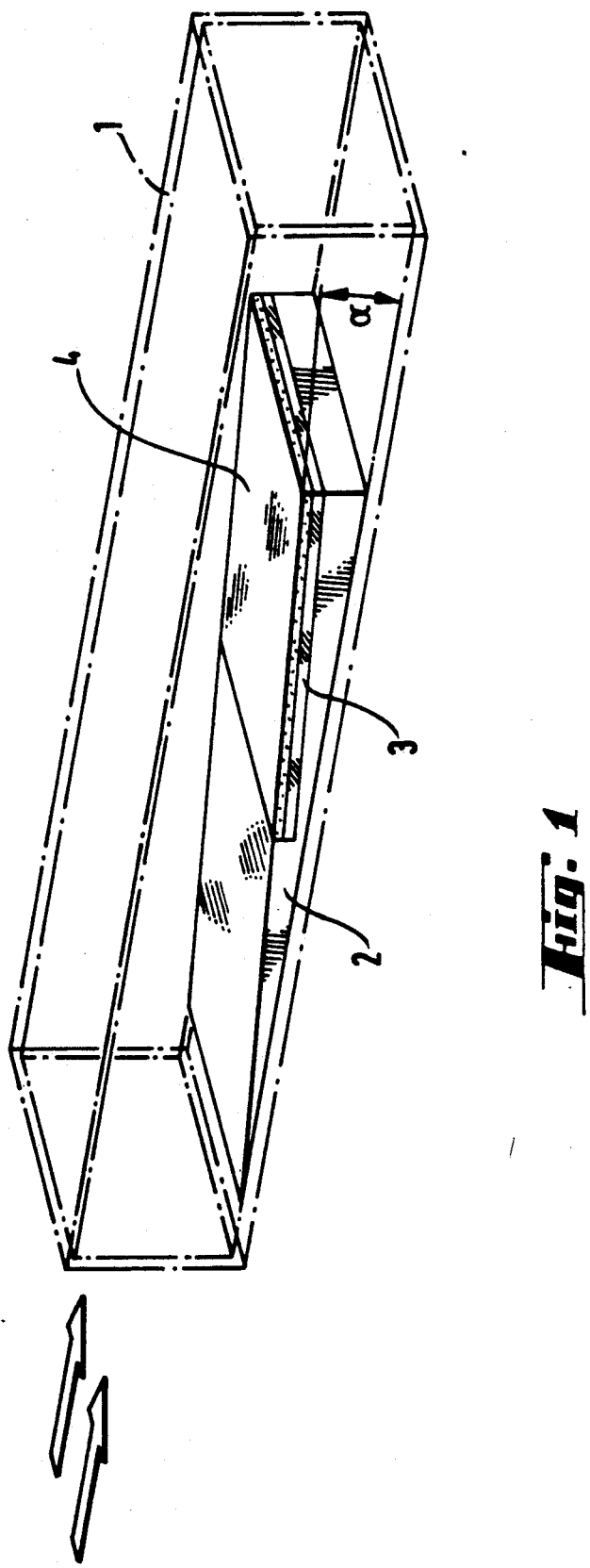
FIG. 1 shows a diagrammatic view of substrates mounted on a holder in a long nozzle.

The liquid-crystalline alignment layers preferably comprise liquid-crystalline main-chain polymers, liquid-crystalline side-chain polymers, a combination of the two, liquid-crystalline networks, guest-host systems or mixtures of the above with one another and/or with low-molecular-weight liquid crystals. It is possible to use thermotropic, lyotropic and amphotropic (i.e. thermotropic+lyotropic) liquid-crystalline materials.

Examples of suitable materials are described in EP-A 348 873, EP-A 322 703, EP-A 310 081, EP-A 300 752 and EP-A 297 554.

Preference is given to the use of LCPs having a glass transition temperature of >150° C., for which purpose liquid-crystalline thermotropic main-chain polymers, in particular, are suitable. These are preferably on the one hand soluble in N-methylpyrrolidone or similar solvents, but on the other hand insoluble in the low-molecular-weight or polymeric liquid-crystalline compounds used as the switchable medium. Particularly suitable are polyester-based main-chain polymers, in particular polyesters comprising aromatic diols and aromatic diesters, optionally with a hydroxycarboxylic acid as a further component. Particular preference is given to a thermotropic polymer based on p-hydroxybenzoic acid, isophthalic acid and hydroquinone. Liquid-crystalline polymers of this type are preferably used as a material for alignment layers which contain a nematic phase. It is also possible to use polymers having, for example, smectic phases.

The liquid-crystalline polymer employed as the alignment layer is aligned by a process which completely or substantially avoids the generation of electrostatic charges and which avoids contamination of the alignment layer by abraded and dust particles. Said polyester-based polymeric liquid-crystalline compounds may, in addition, also be aligned by known processes (such as, for example, by rubbing, brushing or application of electrical or magnetic fields). The polyester-based alignment layers produced in this way can, due to their favorable properties (high homogeneity, strongly aligning effect, etc), advantageously be employed as components in LC displays, in particular for FLC displays.

In particular, however, they can be aligned by the process described below.

The process according to the invention is based on the use of gas or liquid flow over the layer comprising the liquid-crystalline polymer.

The temperature of the gas flow is preferably in the range from 100° to 400° C., in particular from 150° to 350° C. The temperature is particularly preferably higher than the glass transition temperature of the material to be aligned. In a preferred embodiment, the gas is purified beforehand via a filter in order to avoid dust particles.

In the case of liquid flow for aligning the LCPs, a wide range of liquids can be used, preferably those in which the material of the aligned layer is neither readily soluble nor completely insoluble. Examples which may be mentioned of liquids which can be employed even at room temperature are the organic solvents γ-butyrolactone, N-methylpyrrolidone, methyl ethyl ketone, cyclohexanone and diglyme. At temperatures above the glass transition temperature of the polymer, preferred heat transfer media are water, glycerol or appropriate polar liquids.

In order to align the polymer layer by means of a gas stream, the gas should be passed over the polymer layer for a period of, preferably, at least 2 minutes. A process duration of from 5 to 60 minutes, in particular from 10 to 40 minutes, generally results in particularly good alignment of the liquid-crystalline, polymeric material. An excessively long alignment process by means of gas flow is less advantageous, if only for economic reasons.

In a preferred embodiment, the alignment is achieved by a gas stream in which the gas has a temperature in the range of the liquid-crystalline phase, in particular the nematic phase, of the polymeric material.

In a further embodiment, a stream of air is passed onto the polymeric material at an angle of incidence ($\alpha$) of from 0.5° to 10°, in particular from 1° to 5°, which allows particularly good alignment to be achieved.

After treatment of the liquid-crystalline, polymeric material with a gas or liquid flow, the changes in structure and properties caused by this process are frozen by removing the liquid and/or reducing the temperature to below the glass transition temperature of the polymer.

The polymeric alignment layers described can advantageously be employed in liquid-crystal displays, inter alia since they do not have the disadvantages described at the outset of rubbed alignment layers.

The invention is illustrated by the examples below.

EXAMPLES

Example 1

The liquid-crystalline polymer used was a thermotropic main-chain polymer based on p-hydroxybenzoic acid, isophthalic acid and hydroquinone which has a glass transition temperature of 155° C. and a nematic phase in the range from 312° to 336° C. (Modification of the commercially available polymer ®Vectra, registered trademark of Hoechst Celanese Corporation, see also "Vectra-Polymere Werkstoffe, Hoechst High Chem" [Vectra-Polymeric Materials, Hoechst High Chem] magazine, September 1989, Frankfurt am Main). A solution of this polymer in N-methylpyrrolidone (3% by weight) was spin-coated onto the surface of a (previously cleaned) glass substrate. The film was cured for one hour at a temperature of 200° C., so that the solvent had completely evaporated. The substrate treated in this way has a dry, hard polymer film with a thickness of 50 μm. (The thickness can be adjusted via the rotation speed during the spin-coating process).

Substrates produced in this way were then mounted on a holder in or in front of a long nozzle of various shape and variable cross-section. FIG. 1 shows a diagrammatic view of this arrangement (dimensions: 200×25×10 mm). The rectangular parallelepiped (1) represents a nozzle having a rectangular cross-section into which the sample holder (2) has been introduced. On the sample holder (2) is the glass substrate (3), which is covered by a layer of the liquid-crystalline polymer (4). On the left-hand side of the nozzle, two arrows indicate the flow direction of the gas stream. The sample holder (2) holds the glass substrate (3) at the angle of incidence ($\alpha$) with respect to the direction of flow of the gas.

The nozzle (1) was coupled to a heat flux unit whose gas throughput rate and gas temperature were adjustable. In the case of the present measurements, the gas throughput was in each case 400 l/min. The liquid-crystalline, polymeric layer was treated with a unidirectional gas stream at various temperatures and at various tilt angles to the air stream with varying process durations.

After the alignment process, the substrates (glass substrate + alignment layer) were bonded plane-parallel with an antiparallel alignment at a separation of 4 μm using spacers. The measurement cells produced in this way were filled with a liquid-crystalline broad-range mixture having a nematic phase (for example with "ZLI 1565" from E. Merck, Darmstadt).

The contrast of the test cell was measured as follows: the measurement cell was adjusted under crossed polarizers under a polarizing microscope, and the maximum light transmission and minimum light transmission were determined by means of a photodiode. In order to limit the effect of the spectral sensitivity of the diode on the initial voltage (U), a green filter is employed for the measurement. The measurement cells are characterized by the contrast ratio (CR), which is defined by the following equation:

$$CR = \frac{U_{bright} - U_{dark}}{U_{dark}}$$

The values determined in this way were compared with values obtained using commercially available measurement cells of the same thickness, but using rubbed polyimide as the alignment layer (measurement cells from EHC, Tokyo). To ease comparison, the contrast ratio of the EHC cells is defined as 100.

Example 2

The dependence of the alignment of the liquid-crystalline, polymeric layer on the cross-section and the shape of the nozzle and on the angle of incidence of the stream of air was investigated. The results are shown in FIG. 4, where various nozzle shapes are listed under Z, and α describes the angle of incidence of the sample. In the case of nozzle shape (1), the sample holder was outside the nozzle. It is apparent that simply directing the air flow at the liquid-crystalline polymer layer only results in a small degree of alignment. In the case of nozzle shapes (2) and (3), the substrate was positioned inside the nozzle, as indicated in FIG. 1. It is apparent that significantly greater alignment can be achieved in this way. The numerical values given in Table 1 relate to the maximum contrast ratio (CR). In the experiments, the temperature of the gas stream was 200°–360° C., and in the specifically mentioned samples (FIG. 4) the gas had a temperature of 320°–330° C., and the gas used was air. As can be clearly seen from FIG. 4, the use of a nozzle having a rectangular cross-section (3) results in significantly better alignment, presumably attributable to a more favorable (laminar) air flow. Comparison of the measurements at various angles of incidence (α) with the sample shows that an angle of incidence of 3° results in significantly improved results.

Example 3

The dependence of the alignment of the liquid-crystalline, polymeric layer on the temperature of the gas stream and on the duration was investigated. Substrates were produced as described in Example 1 and mounted in a nozzle having a rectangular cross-section of dimensions 200×25×10 mm at an angle of incidence (α) of 3°.

Figure 2:
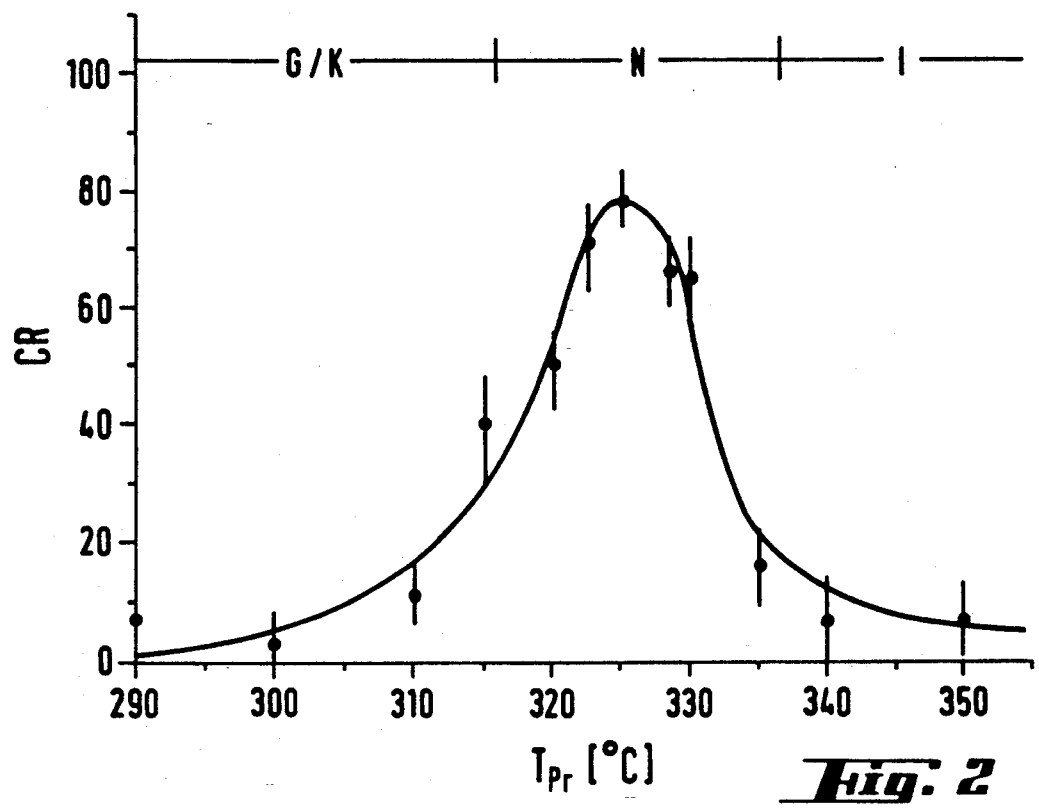
FIG. 2 shows the alignment effect of the air stream on the liquid-crystalline, polymeric layer.

As can be seen from FIG. 2, the alignment effect of the air stream on the liquid-crystalline, polymeric layer is the greatest when the air stream has a temperature in the range of the nematic phase of the thermotropic polymer. In FIG. 2, the contrast ratio (CR) of the test cell is plotted against the temperature (in °C.). The process lasted 20 minutes (i.e. the polymer layer was exposed to said air stream in the nozzle for 20 minutes). In the present example, an optimum contrast ratio was achieved at a temperature of 326° C. The test cells aligned at this temperature had a contrast of up to 80%, compared with the contrast of the commercially available EHC cells.

Figure 3:
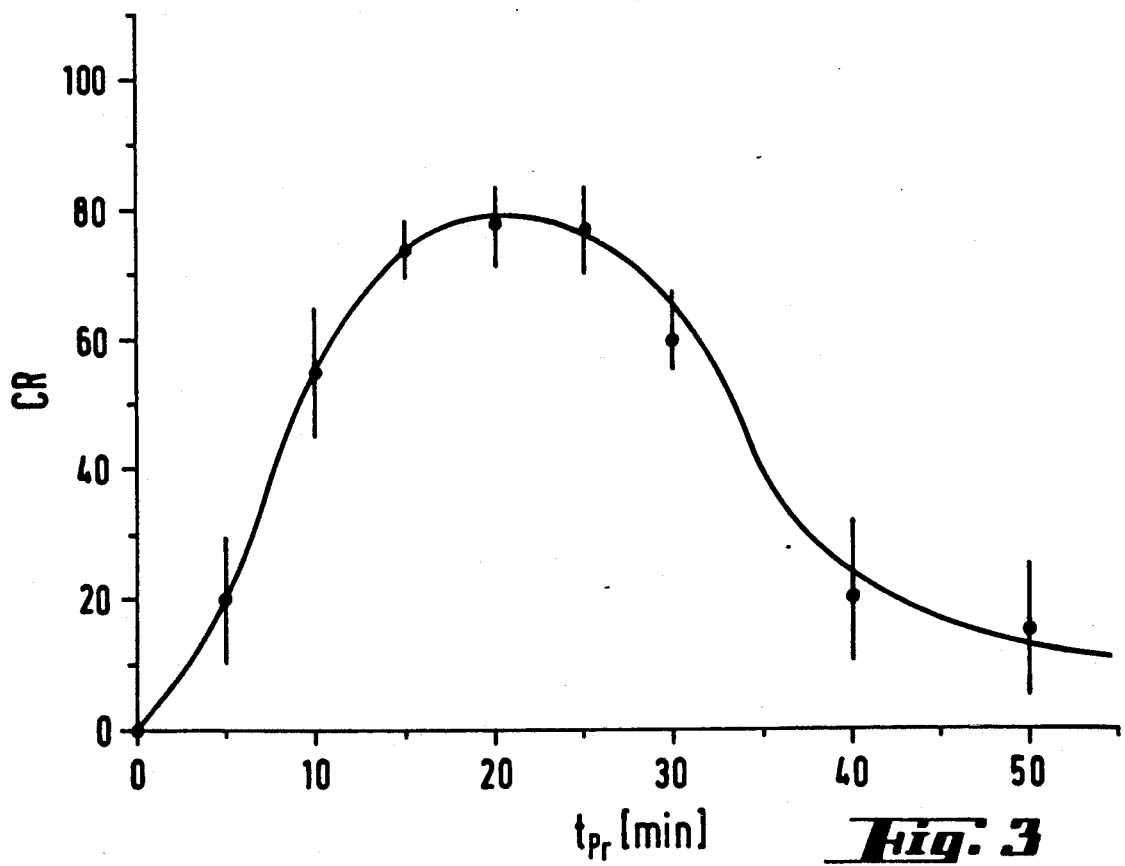
FIG. 3 shows the effect of the process duration ($t_{pr}$) on the contract ration (CR).

FIG. 3 shows the effect of the process duration ($t_{pr}$) on the contrast ratio (CR). The measurements were carried out at a gas stream temperature of 326° C. It was apparent that the alignment effect of the air stream on the liquid-crystalline, polymeric material does not become visible until a treatment duration of some minutes. Optimum alignment is achieved after a treatment time of from 15 to 25 minutes.

Example 4

The polyester layer applied to a glass substrate as in Example 1 may likewise be aligned by rubbing (for example with velour), and the alignment layer produced in this way can advantageously be employed as a component in a measurement cell or in an LC display.

I claim;

1. A process for aligning a layer of a liquid-crystalline, polymeric material, which comprises passing a laminar gas stream, having a temperature in the range of the nematic phase of the liquid-crystalline polymeric material, over the liquid-crystalline, polymeric material to achieve said aligning of said layer.

2. The process as claimed in claim 1, wherein the liquid-crystalline, polymeric material used is a thermotropic main-chain polymer.

3. The process as claimed in claim 1, wherein the liquid-crystalline, polymeric material used is a thermotropic main-chain polymer based on p-hydroxybenzoic acid, isophthalic acid and hydroquinone which has a nematic liquid-crystal phase.

4. The process as claimed in claim 1, wherein a stream of air is passed over the liquid-crystalline, polymeric material.

5. The process as claimed in claim 1, wherein the alignment is effected by a gas stream passed over the polymeric layer for at least 2 minutes.

6. The process as claimed in claim 4, wherein the air stream is passed onto the polymeric material at an angle of incidence (α) of from 0.5° to 10°.

7. The process as claimed in claim 4, wherein the air stream is passed onto the polymeric material at an angle of incidence (α) of from 1° to 5°.

* * * * *